April 12, 1960 J. L. SMITH 2,932,378
EGG GRIPPING HOLDER
Filed Sept. 30, 1958
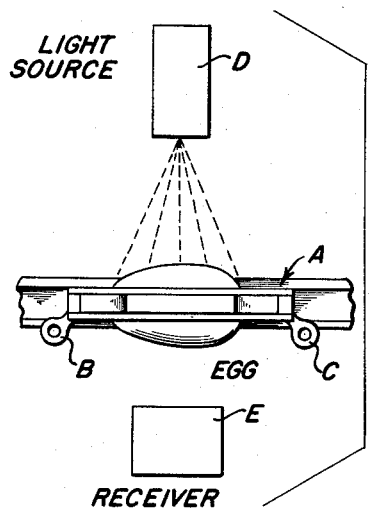
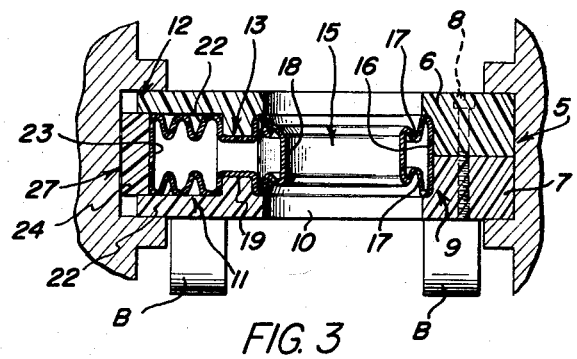
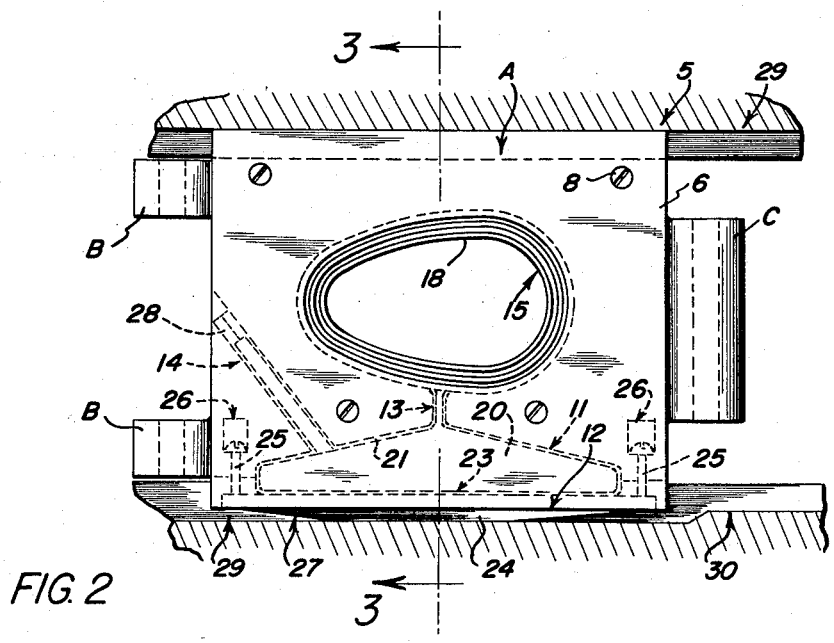
INVENTOR
JAMES L. SMITH
BY
ATTORNEYS United States Patent Office 2,932,378
Patented Apr. 12, 1960

2,932,378

EGG GRIPPING HOLDER

James L. Smith, Clarendon Hills, Ill., assignor to Continental Can Company, Inc., New York, N.Y., a corporation of New York Application September 30, 1958, Serial No. 764,397

7 Claims. (Cl. 198—131)

The invention relates generally to egg handling and primarily seeks to provide a novel and efficiently operable device for firmly gripping eggs without danger of breakage thereof.

While adaptable to more general usages the improved device is designed particularly for use in the candling of eggs. It is well known that in this practice the eggs commonly are subjected to visual inspection, while they are held opposite a light source effective to make the eggs more or less translucent. In one known modern method of testing eggs, light rays in the invisible spectrum are employed and the light rays passing through the eggs are received in a light sensitive cell or receiver and are analyzed by a detecting device effective to indicate the quality of the eggs. In such uses, it is important that the light rays pass through the eggs under test, and not around them, on their way to the light sensitive cell, and it is a purpose of the present invention to provide an improved egg holding device which will not only firmly grip each egg under test about the whole ovate perimeter thereof, but also will accomplish that purpose in a manner assuring against breakage of the eggs and any objectionable passage of light rays about exterior portions at the gripped areas of the eggs.

An object of the invention is to provide an egg holder of the character stated comprising an opaque body having at least one egg shaped opening therethrough large enough to receive and pass the largest egg likely to be presented for test, a recess or chamber surrounding and communicating inwardly into the opening, an inwardly expansible egg gripping bellows mounted in the recess or chamber and presenting a gripping wall in the opening, and means for applying pressure in the bellows to force the gripping wall inwardly in the opening to firmly grip an egg deposited therein.

Another object of the invention is to provide a device of the character stated wherein the egg gripping wall forms a part of a bellows structure in which air is trapped and wherein there is included means for applying pressure to the bellows structure to compress a portion thereof and cause the trapped air to act upon the egg gripping wall and force it inwardly into gripping contact about an egg deposited in the holder opening.

Another object of the invention is to provide a device of the character stated wherein the bellows structure includes an expansible egg shaped portion surrounding the body opening, a second expansible reservoir portion recessed in said body, a duct communicating between said bellows portions, and means through which the bellows structure can be inflated whereby application of pressure upon said reservoir portion and the resulting reduction of its air holding capacity will result in a forcing of air through the duct into the egg shaped portion and expansion of the latter inwardly to firmly grip an egg deposited in the holder body opening.

A further object of the invention is to provide an egg gripping holder of the character stated wherein the holder has a side opening in which a presser bar is movably mounted, said bar engaging the reservoir portion of the bellows structure at its inner face and having its outer face exposed for pressure contact with a pressure applying means.

A still further object of the invention is to provide a holder of the character stated which may readily be connected in a conveyor chain structure effective to convey the eggs through loading and testing stations and past stationary pressure applying means for applying pressure to the holder presser bars when it is desired to apply egg gripping pressure in the egg shaped bellows structure portions.

With the above and other objects in view that will hereinafter appear, the nature of the invention will be more clearly understood by reference to the following detailed description, the appended claims and the several views illustrated in the accompanying drawing.

In the drawing:

Figure 1 is a diagrammatic view illustrating one use of the invention in which the egg holders are passed between a light ray source and a light ray receiver.

Figure 2 is a plan view illustrating one of the improved egg gripping holders.

Figure 3 is a vertical cross section taken on the line 3—3 on Figure 2.

This invention relates broadly to egg holding devices and may be embodied in practical apparatus for use in various processing methods of which candling forms a well known example. In this example disclosure, single units each having a single egg holding opening or pocket are shown, but it is to be understood that the units may be equipped with holding openings or pockets in multiple, and they may be adapted for stationary use, or for use in motion other than the endless chain conveyor mounting suggested herein.

When used in candling processes, the holders generally designated A may be equipped with interfitting lug equipments B and C subject to connection in the formation of a conveyor which may be employed to convey the eggs rapidly past a testing or candling station. An example testing method may employ light rays in the invisible spectrum. The light rays passing through the eggs are received in a light sensitive cell and are analyzed by a computing device that indicates various qualities of the egg tested. Such an arrangement is diagrammatically illustrated in Figure 1 wherein the holders A gripping the eggs to be tested are passed between the light source D and the receiver E.

The example holder unit herein shown preferably comprises a plastic body 5 composed of upper and lower matching plates 6 and 7 removably secured together by screws 8. The plates 6 and 7 have complementary opposed face recessing cooperating in the manner illustrated in Figures 2 and 3 in the provision of a recess 9 surrounding the egg receiving opening 10, a reservoir chamber 11 opening through one side wall 12, a clearance 13 connecting between the recess 9 and the chamber 11, and a bore 14 opening into the chamber 11 through an end of the body 5, as shown in Figure 2.

A bellows structure is mounted in the recessing 9—13—11—14 and include an egg shaped bellows portion 15 having an outer wall 16 which is bonded in the recess 9, and connected by fluted upper and lower walls 17 with the inner, egg gripping wall 18 which parallels the outer wall 16. The bellows structure also includes the connecting portion 19 extending the body clearance 13 and connected with the reservoir portion 20 in the chamber 11. The reservoir portion of the bellows structure has an inner wall 21 which is connected by fluted or folded upper and lower walls 22 with an outer wall 23 paralleling the body side wall 12.

The wall 23 of the bellows structure reservoir portion is engaged by a presser bar 24 which is operable in the chamber 11 and is permitted a limited outward movement by the headed retaining screws 25 engaged in the limiting sockets 26 formed in the body, said bar being thus permitted limited projection as at 27 beyond the outer face of the body side 12, as clearly illustrated in Figures 2 and 3.

The bellows structure also includes a self-sealing inflating tube 28 projected into the body bore 14 and through which the whole bellows structure can be inflated by introduction of air thereinto, after the fashion of needle injection inflation as practiced in the inflation of a football bladder or the like. It is to be understood that the form of the bellows structure and the inflation thereof is such as to maintain the reservoir portion 20 thereof and the egg encircling portion 15 thereof in the inflated condition illustrated in Figures 2 and 3, but with the egg contour opposing or gripping wall 18 thereof of such size as to freely receive the largest egg likely to be encountered in any testing operation. Thus, it will be apparent that any inward pressure applied to the presser bar 24 will serve to reduce the air holding capacity of the reservoir portion 20 of the bellows structure and force air into the egg encircling portion 15 so as to cause the latter to expand inwardly and place the wall 18 thereof in firm gripping contact with an egg deposited in the holder opening. It naturally follows that release of such inward pressure on the bar 24 will allow the reservoir portion 20 of the bellows structure to expand to its normal condition and relieve pressure within the egg encircling portion 15 so that the egg gripping wall 18 thereof will release its grip and permit a discharging or dropping of the previously gripped egg.

Many arrangements of the holder units in the conveying structure and testing apparatus may be resorted to, and there is illustrated herein the very simple expedient of providing guides 29 through which the holder body 5 may be conveyed when connected in conveyor form, thereby to present the holders successively at egg receiving, egg testing and egg discharging stations.

It is to be understood that at each of the egg receiving and egg discharging stations the bellows structure in each holder unit will be in the relaxed condition illustrated in Figures 2 and 3 with the egg gripping wall 18 thereof expanded so that an egg can be freely received in the holder opening at the loading station and dropped therefrom at the discharging station. Between said stations or in other words while the holders are passing to, through and from the testing station, the presser bars 27 may be engaged with a ramp or camming project such as is indicated at 30 in Figure 2 and which will serve to displace the presser bar inwardly and bring about the desired firm egg gripping action previously described.

While a preferred example disclosure is made herein, it is to be understood that variations in the structure and arrangement of parts may be made without departing from the spirit of the invention as defined in the appended claims.

I claim:

1. An egg holder comprising an opaque body having an egg shaped opening therethrough large enough to receive and pass the largest egg likely to be presented to the holder for being held in said opening, a recess surrounding and opening into said opening, an inwardly expansible bellows structure mounted in said recess and presenting an egg gripping wall in the opening, and self-contained means for applying pressure in the bellows structure to force the egg gripping wall inwardly in the opening to firmly grip an egg deposited therein.

2. An egg holder as defined in claim 1 wherein the bellows structure has air trapped therein and there is included means for applying pressure to a portion of the bellows structure to reduce its capacity for holding the trapped air whereby a second portion of the bellows structure will be expanded to force the egg gripping wall inwardly for the egg gripping purpose.

3. An egg holder as defined in claim 1 wherein the bellows structure includes an expansible egg shaped portion surrounding the body opening, a second expansible reservoir portion recessed in the body, a duct communicating between said bellows portions, and means through which the bellows structure can be inflated, whereby application of pressure upon the reservoir portion and the resulting reduction of its air holding capacity will result in a forcing of air through the duct into the egg shaped portion and expansion of the latter inwardly to firmly grip an egg deposited in the holder body opening.

4. An egg holder as defined in claim 1 wherein the bellows structure includes an expansible egg shaped portion surrounding the body opening, a second expansible reservoir portion recessed in the body, a duct communicating between said bellows portions and means through which the bellows structure can be inflated, whereby application of pressure upon the reservoir portion and the resulting reduction of its air holding capacity will result in a forcing of air through the duct into the egg shaped portion and expansion of the latter inwardly to firmly grip an egg deposited in the holder body opening, said body having a side opening in which a presser bar is mounted, said bar engaging the reservoir portion of the bellows structure at its inner face and having its outer face exposed for pressure contact with a pressure applying means.

5. An egg holder as defined in claim 1 wherein the bellows structure includes an expansible egg shaped portion surrounding the body opening, a second expansible reservoir portion recessed in the body, a duct communicating between said bellows portions, and means through which the bellows structure can be inflated, whereby application of pressure upon the reservoir portion and the resulting reduction of its air holding capacity will result in a forcing of air through the duct into the egg shaped portion and expansion of the latter inwardly to firmly grip an egg deposited in the holder body opening, said body comprising upper and lower plates removably secured in face to face contact with said contacting faces provided with mating recesses in which to receive the bellows structure.

6. An egg holder as defined in claim 1 wherein the bellows structure includes an expansible egg shaped portion surrounding the body opening, a second expansible reservoir portion recessed in the body, a duct communicating between said bellows portions and means through which the bellows structure can be inflated, whereby application of pressure upon the reservoir portion and the resulting reduction of its air holding capacity will result in a forcing of air through the duct into the egg shaped portion and expansion of the latter inwardly to firmly grip an egg deposited in the holder body opening, said body having a side opening in which a presser bar is mounted, said bar engaging the reservoir portion of the bellows structure at its inner face and having its outer face exposed for pressure contact with a pressure applying means, said body comprising upper and lower plates removably secured in face to face contact with said contacting faces provided with mating recesses in which to receive the bellows structure and said bar, and movement limiting headed pin means supporting said bar and engaging in movement limiting sockets provided therefor in the body.

7. An egg holder as defined in claim 1 wherein the bellows structure includes an expansible egg shaped portion surrounding the body opening, a second expansible reservoir portion recessed in the body, a duct communicating between said bellows portions and means through which the bellows structure can be inflated, whereby application of pressure upon the reservoir portion and the resulting reduction of its air holding capacity will result in a forcing of air through the duct into the egg shaped portion and expansion of the latter inwardly to firmly grip an egg deposited in the holder body opening, said body having a side opening in which a presser bar is mounted, said bar engaging the reservoir portion of the bellows structure at its inner face and having its outer face exposed for pressure contact with a pressure applying means, said body also including sides and ends and means on said ends for connecting like holders together in a conveyor structure through which movement may be imparted to the holder units, guide means engageable by said sides for guiding movement of the holders when connected as a conveyor, and means engageable by the exposed outer face of the bar of each holder for applying inward pressure to the bar.

References Cited in the file of this patent

UNITED STATES PATENTS

| | | |
|---|---|---|
| 877,490 | Davis | Jan. 28, 1908 |
| 2,443,987 | Morrison | June 22, 1948 |
| 2,756,883 | Schreck | July 31, 1956 |